United States Patent
Zuo et al.

(10) Patent No.: US 11,772,515 B2
(45) Date of Patent: Oct. 3, 2023

(54) BATTERY PACK HEATING SYSTEM AND CONTROL METHOD THEREOF

(71) Applicant: Contemporary Amperex Technology Co., Limited, Ningde (CN)

(72) Inventors: Xiyang Zuo, Ningde (CN); Zhimin Dan, Ningde (CN); Xiong Zheng, Ningde (CN); Bao Li, Ningde (CN); Tiancong Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/385,879

(22) Filed: Jul. 26, 2021

(65) Prior Publication Data

US 2021/0354592 A1 Nov. 18, 2021

Related U.S. Application Data

(63) Continuation of application No. PCT/CN2020/087767, filed on Apr. 29, 2020.

(30) Foreign Application Priority Data

Jun. 24, 2019 (CN) .......................... 201910547455.8

(51) Int. Cl.
*B60L 58/27* (2019.01)
*H01M 10/615* (2014.01)
(Continued)

(52) U.S. Cl.
CPC ............... *B60L 58/27* (2019.02); *B60L 58/12* (2019.02); *H01M 10/425* (2013.01);
(Continued)

(58) Field of Classification Search
CPC .... B60L 58/27; B60L 58/12; B60L 2240/545; H01M 10/425; H01M 10/615;
(Continued)

(56) References Cited

U.S. PATENT DOCUMENTS 9,954,391 B2 * 4/2018 Lei .......................... H02J 1/122
10,647,211 B2 * 5/2020 Ogaki ................. H01M 10/425
(Continued)

FOREIGN PATENT DOCUMENTS

CN 102668229 A 9/2012
CN 103419663 A 12/2013
(Continued)

OTHER PUBLICATIONS

International Search Report for PCT Application No. PCT/CN2020/087767, dated Jul. 29, 2020, 13 pages.
(Continued)

*Primary Examiner* — M Baye Diao
(74) *Attorney, Agent, or Firm* — East IP P.C.

(57) ABSTRACT

A battery pack heating system includes: a main positive switch, a main negative switch, an inverter, an external port, a motor, a control module for auxiliary charging branch, a vehicle control unit, a motor control unit, and a battery management module. The battery management module is configured to send, when an acquired state parameter of the battery pack meets a preset low-temperature-low-power condition, a low-temperature-low-power heating request instruction to the vehicle control unit and the control module respectively. The control module is configured to send a first control signal to control the auxiliary charging branch to be connected. The vehicle control unit is configured to send a second control signal to enable the motor control unit to control on-off of the switch modules in the inverter, and a third control signal to enable the battery management module to control on-off of the main positive switch.

9 Claims, 5 Drawing Sheets

(51) Int. Cl.
  *H01M 10/625*  (2014.01)
  *H01M 10/633*  (2014.01)
  *H01M 10/657*  (2014.01)
  *B60L 58/12*  (2019.01)
  *H01M 10/42*  (2006.01)

(52) U.S. Cl.
  CPC ....... *H01M 10/615* (2015.04); *H01M 10/625* (2015.04); *H01M 10/633* (2015.04); *H01M 10/657* (2015.04); *B60L 2240/545* (2013.01); *H01M 2010/4271* (2013.01); *H01M 2220/20* (2013.01)

(58) Field of Classification Search
  CPC ............. H01M 10/625; H01M 10/633; H01M 10/657; H01M 2010/4271; H01M 2220/20; H01M 10/63; H01M 10/66; Y02T 10/7072; Y02T 90/12; Y02T 90/16; Y02T 10/70; Y02T 90/14; Y02E 60/10
  USPC .......................................... 307/10.1; 320/129
  See application file for complete search history.

(56) References Cited

U.S. PATENT DOCUMENTS

| | | | | |
|---|---|---|---|---|
| 10,780,795 | B2* | 9/2020 | Zuo | ..................... H01M 10/625 |
| 11,500,346 | B2* | 11/2022 | Valin | ..................... F24S 23/77 |
| 2011/0144861 | A1 | 6/2011 | Lakirovich et al. | |
| 2011/0298427 | A1 | 12/2011 | Uemura et al. | |
| 2012/0280660 | A1 | 11/2012 | Aga et al. | |
| 2014/0285135 | A1* | 9/2014 | Ji | ........................ H01M 10/615 320/129 |
| 2021/0359348 | A1* | 11/2021 | Zheng | ..................... B60L 58/27 |

FOREIGN PATENT DOCUMENTS

| | | | |
|---|---|---|---|
| CN | 103427137 | A | 12/2013 |
| CN | 103560304 | A | 2/2014 |
| CN | 104396083 | A | 3/2015 |
| CN | 204289653 | U | 4/2015 |
| CN | 104779652 | A | 7/2015 |
| CN | 106229583 | A | 12/2016 |
| CN | 106965700 | A | 7/2017 |
| CN | 107666028 | A | 2/2018 |
| CN | 108682909 | A | 10/2018 |
| CN | 108847513 | A | 11/2018 |
| CN | 105762434 | B | 12/2018 |
| CN | 110962692 | A | 4/2020 |
| EP | 2865044 | B1 | 11/2016 |
| EP | 3318443 | A2 | 5/2018 |
| JP | H09259937 | A | 10/1997 |
| JP | 2013518550 | A | 5/2013 |
| JP | 2014072955 | A | 4/2014 |
| JP | 2014089915 | A | 5/2014 |
| JP | 5849917 | B2 | 2/2016 |
| JP | 2020109754 | A | 7/2020 |
| JP | 2020110042 | A | 7/2020 |

OTHER PUBLICATIONS

The extended European search report for EP Application No. 20175237.5, dated Nov. 9, 2020, 6 pages.
The first Office Action for China Application No. 201910547455.8, dated Jul. 22, 2020, 7 pages.
The first Office Action for Japanese Application No. 2020-048833, dated May 21, 2021, 6 pages
The First Office Action for China Application No. 202011319289.5, dated Oct. 26, 2021, 7 pages.

* cited by examiner

BATTERY PACK HEATING SYSTEM AND CONTROL METHOD THEREOF

CROSS-REFERENCE OF RELATED APPLICATION

The application is a continuation of International Application No. PCT/CN2020/087767 filed on Apr. 29, 2020, which claims priority to Chinese Patent Application No. 201910547455.8 filed on Jun. 24, 2019 and entitled "BATTERY PACK HEATING SYSTEM AND CONTROL METHOD THEREOF". The applications are incorporated herein by reference in their entirety.

TECHNICAL FIELD

The present application generally relates to batteries, and more particularly to a battery pack heating system and a control method thereof.

BACKGROUND

With the development of new energy, it is used as power in more and more fields. Battery is widely used in new energy vehicles, consumer electronics, energy storage systems and other fields, due to its advantages, such as high energy density, recyclable charging capability, good safety, environmental friendly, and the like.

However, use of battery in a low temperature environment is subject to certain restrictions. Specifically, discharge capacity of the battery in the low temperature environment would degrade severely, and the battery cannot be charged in the low temperature environment. Therefore, in order to be able to use the battery normally, it is necessary to heat the battery in the low temperature environment.

Currently, a heat-circulating container may be dedicatedly provisioned for the battery. Heat-conducting material in the heat-circulating container can be heated and heat can be transferred to the battery. As a result, the battery is heated indirectly. However, such a heating method takes a long time and heating efficiency is low.

SUMMARY

Embodiments of the present application provide a battery pack heating system and a control method thereof, which may improve heating efficiency of a battery pack.

In a first aspect, an embodiment of the present application provides battery pack heating system, including: a main positive switch connected to a positive electrode of a battery pack, a main negative switch connected to a negative electrode of the battery pack, an inverter connected to the main positive switch and the main negative switch, an external port connected to the inverter, a motor connected to the inverter, a control module for auxiliary charging branch, a vehicle control unit, a motor control unit, and a battery management module, wherein: the inverter includes a plurality of switch modules; the external port is connected to an auxiliary charging branch, and the auxiliary charging branch includes a power supply; the battery management module is configured to acquire a state parameter of the battery pack, and send, when the state parameter of the battery pack meets a preset low-temperature-low-power condition, a low-temperature-low-power heating request instruction to the vehicle control unit and the control module for auxiliary charging branch respectively; the control module for auxiliary charging branch is configured to send a first control signal to the auxiliary charging branch in response to the low-temperature-low-power heating request instruction to control the battery pack heating system to be connected to the auxiliary charging branch so as to enable the power supply to transmit energy to the battery pack and/or the motor via the external port; and the vehicle control unit is configured to send, in response to the low-temperature-low-power heating request instruction, a second control signal to the motor control unit to enable the motor control unit to control on-off of the switch modules in the inverter, and a third control signal to the battery management module to enable the battery management module to control on-off of the main positive switch to enable transmission of energy between the battery pack and the motor, so as to heat the battery pack.

In a second aspect, an embodiment of the present application provides a control method for a battery pack heating system applicable to the battery pack heating system in the first aspect. The control method for the battery pack heating system includes: acquiring, by the battery management module, a state parameter of the battery pack, and sending a low-temperature-low-power heating request instruction to the vehicle control unit and the control module for auxiliary charging branch respectively when the state parameter of the battery pack meets a preset low-temperature-low-power condition; sending, by the control module for auxiliary charging branch, a first control signal to the auxiliary charging branch in response to the low-temperature-low-power heating request instruction to control the battery pack heating system to be connected to the auxiliary charging branch, so as to enable the power supply to transmit energy to the battery pack and/or the motor via the external port; and sending, by the vehicle control unit in response to the low-temperature-low-power heating request instruction, a second control signal to the motor control unit to enable the motor control unit to control on-off of the switch modules in the inverter, and a third control signal to the battery management module to enable the battery management module to control on-off of the main positive switch to enable transmission of energy between the battery pack and the motor, so as to heat the battery pack.

Embodiments of the present application provide a battery pack heating system and a control method thereof. The battery management module may determine that the state parameter of the battery pack meets the preset low-temperature-low-power condition, and send a low-temperature-low-power heating request instruction to the vehicle control unit and the control module for auxiliary charging branch respectively for a low-temperature-low-power heating mode. The battery management module may control the control module for auxiliary charging branch, and the vehicle control unit may control the battery management module and the motor control unit, then the auxiliary charging branch, the main positive switch and the switch modules in the inverter can be controlled to enable the power supply of the auxiliary charging branch to transmit energy to the battery pack and/or the motor, so that the battery pack and motor can have sufficient energy to support heating of the battery pack. The battery pack and the motor may transmit energy to each other to form a cycle in which the battery pack is charged and discharged, so that a current is generated in a circuit in which the battery pack is located. The alternating current may continuously pass through the battery pack, so that the internal resistor of the battery pack may emit heat. As a result, uniform and highly efficient self-heating of the battery pack can be realized even in the case of low power.

BRIEF DESCRIPTION OF THE DRAWINGS

The present application will be better understood by reading the following detailed description with reference to the appended drawings, in which the same or similar numerals represent the same or similar features.

DETAILED DESCRIPTION

Features of various aspects and exemplary embodiments of the present application will be described in detail below. In the following detailed description, many specific details are disclosed to provide a thorough understanding of the present application. However, it is apparent to a person skilled in the art that the present application may be practiced without some of these specific details. The following descriptions of embodiments are merely to provide a better understanding of the present application through illustrating examples of the present application. The present application is by no means limited to any specific configuration and algorithm disclosed below, but rather covering any modification, substitution, and improvement of elements, components, and algorithms without departing from the spirit of the present application. In the appended drawings and the following descriptions, well-known structures and techniques are not illustrated to avoid unnecessarily obscuring the present disclosure.

Embodiments of the present application provide a battery pack heating system and a control method thereof, which may be applied to a scene where a battery pack is heated under a condition with low temperature and low state of charge (SOC) of the battery pack. With the battery pack heating system and the control method for the battery pack heating system in the embodiments of the present application, the temperature of the battery pack can be raised to a temperature at which the battery pack may operate normally. The battery pack may include at least one battery module or at least one battery cell, which is not limited herein. The battery pack can be applied to an electric vehicle to supply power to the motor as a power source of the electric vehicle. The battery pack may also supply power to other electric devices in the electric vehicle, which is not limited herein.

In an embodiment of the present application, with control of the battery pack heating system, when the state parameter of the battery pack meets the preset low-temperature-low-power condition, the power supply in the auxiliary charging branch may provide the battery pack and/or the motor with a portion of energy transferred between the battery pack and the motor that is required for heating the battery pack. That is, the sum of the energy supplied by the power supply in the auxiliary charging branch and the original energy in the battery pack and the motor are sufficient to support the heating of the battery pack. As a result, the battery pack can be charged under a condition of low temperature and low power, and the charging efficiency can be improved.

Figure 1:
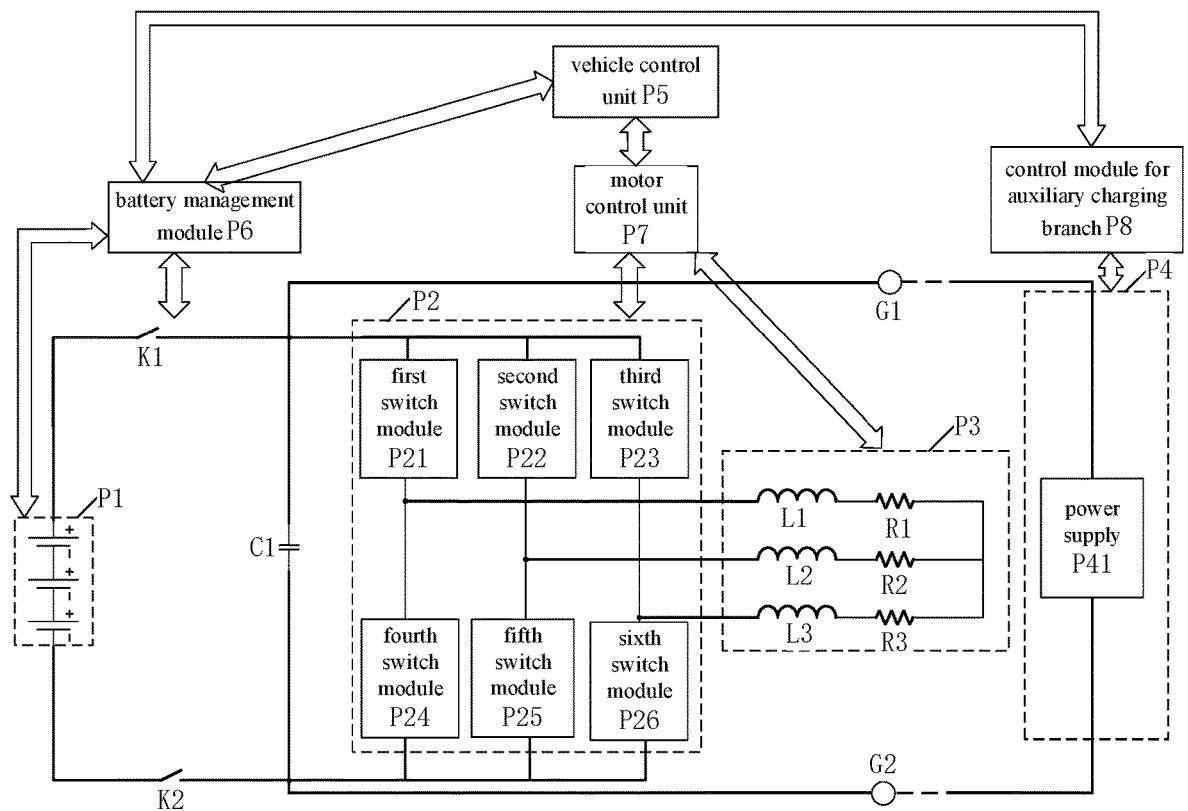
FIG. 1 is a schematic structure diagram of a battery pack heating system according to an embodiment of the present application.

FIG. 1 is a schematic structure diagram of a battery pack heating system according to an embodiment of the present application. As shown in FIG. 1, the battery pack heating system may include a main positive switch K1 connected to a positive electrode of a battery pack P1, a main negative switch K2 connected to a negative electrode of the battery pack P1, an inverter P2 connected to the main positive switch K1 and the main negative switch K2, external ports G1 and G2 connected to inverter P2, a motor P3 connected to the inverter P2, a control module for auxiliary charging branch P8, a vehicle control unit (Vehicle Control Unit, VCU) P5, a motor control unit (Motor Control Unit, MCU) P7, and a battery management module P6. The battery management module P6 may be a battery management system (Battery Management System, BMS). The control module for auxiliary charging branch P8 may be a circuit control unit (Circuit Control Unit, CCU).

In some examples, a safety module may be disposed between the battery pack P1 and the main positive switch K1, or safety modules may be disposed between a plurality of battery cells connected in the battery pack, which is not limited herein. In some examples, the safety module may be a manual service disconnect (Manual Service Disconnect, MSD).

The inverter P2 may include a plurality of switch modules.

In some examples, as shown in FIG. 1, inverter P2 includes a first phase bridge arm, a second phase bridge arm, and a third phase bridge arm that are connected in parallel. The first phase bridge arm, the second phase bridge arm, and the third phase bridge arm each have an upper bridge arm and a lower bridge arm. The upper bridge arm may be provided with a switch module, and the lower bridge arm may be provided with a switch module. That is, the first phase bridge arm is a U-phase bridge arm, the switch module of the upper bridge arm of the U-phase bridge arm is a first switch module, and the switch module of the lower bridge arm of the U-phase bridge arm is a fourth switch module. The second phase bridge arm is a V-phase bridge arm, the switch module of the upper bridge arm of the V-phase bridge arm is a second switch module, and the switch module of the lower bridge arm of the V-phase bridge arm is a fifth switch module. The third phase bridge arm is a W phase bridge arm, the switch module of the upper bridge arm of the W phase bridge arm is a third switch module, and the switch module of the lower bridge arm of the W phase bridge arm is a sixth switch module P26.

In some examples, the switch modules may include one or more of an insulated gate bipolar transistor (Insulated Gate Bipolar Transistor, IGBT) chip, an IGBT module, a metal-oxide-semiconductor field-effect transistor (Metal-Oxide-Semiconductor Field-Effect Transistor, MOSFET), and other power switches. Here, the combination and connection manner of each IGBT device, MOSFET device, and the like in the switch modules are not limited. Material type of the above power switches is also not limited. For example, a power switch made of silicon carbide (i.e., SiC) or other materials may be used.

Specifically, the switch module(s) has a diode(s). For the switch module of the upper bridge arm, the anode of the diode may be connected to the connection point of the upper bridge arm and the lower bridge arm, and the cathode of the diode may be located between the upper bridge arm and the main positive switch K1. For the switch module of the lower bridge arm, the anode of the diode may be located between the lower bridge arm and the main negative switch K2, and the cathode of the diode may be connected to the connection point of the upper bridge arm and the lower bridge arm.

In some examples, the switch module may include a power switch. The diode of the above power switch may be a parasitic diode or a specially designed diode. The material type of the diode is also not limited. For example, a diode made of silicon (i.e., Si), silicon carbide (i.e., SiC), or other materials may be used.

The inverter P2 may be connected to the motor P3. In some examples, as shown in FIG. 1, the first phase input terminal, the second phase input terminal, and the third phase input terminal of the motor P3 are respectively connected to the connection point of the upper bridge arm and the lower bridge arm of the first phase bridge arm, the connection point of the upper bridge arm and the lower bridge arm of the second phase bridge arm, and the connection point of the upper bridge arm and the lower bridge arm of the third phase bridge arm.

For example, as shown in FIG. 1, the stator of motor P3 is equivalent to three-phase stator inductors and resistors. The stator inductor(s) is capable of energy storage. The stator inductor and resistor in each phase are connected to a phase bridge arm. The three-phase stator inductors are taken as a first stator inductor L1, a second stator inductor L2, and a third stator inductor L3, respectively. A first resistor R1 is correspondingly connected to the first stator inductor L1, a second resistor R2 is correspondingly connected to the second stator inductor L2, and a third resistor R3 is correspondingly connected to the third stator inductor L3. The first phase input terminal, the second phase input terminal, and the third phase input terminal of the motor P3 may be used as an input terminal to input current, and may also be used as an output terminal to output current.

Specifically, one end of the first stator inductor L1 may be the first phase input terminal, and the other end of the first stator inductor L1 may be connected to one end of the second stator inductor L2 and one end of the third stator inductor L3. The other end of the second stator inductor L2 may be the second phase input terminal. The other end of the third stator inductor L3 may be the third phase input terminal.

The external ports G1 and G2 may be connected to an auxiliary charging branch P4. The auxiliary charging branch P4 may include a power supply P41. For example, the external ports G1 and G2 may be high voltage charging interfaces. In some examples, the power supply P41 may be a voltage source for which voltage is adjustable.

The battery management module P6 may be configured to obtain a state parameter of the battery pack P1. If the state parameter of the battery pack P1 meets a preset low-temperature-low-power condition, the battery management module P6 may be configured to send a low-temperature-low-power heating request instruction to the vehicle control unit P5 and the control module for auxiliary charging branch P8 respectively. If the state parameter of the battery pack P1 meets the preset low-temperature-low-power condition, it is indicated that the state parameter of the battery pack P1 is insufficient to support normal operation of the battery pack P1. The low-temperature-low-power heating request instruction may be used to instruct the battery pack heating system to enter a low-temperature-low-power heating mode.

In some examples, the state parameter may include a temperature and a state of charge (SOC). The preset low-temperature-low-power condition may include the temperature being lower than a heating temperature threshold, and the SOC is lower than a heating SOC requirement threshold. If the state parameter meets the preset low-temperature-low-power condition, it is indicated that the temperature of the battery pack P1 is insufficient to support the normal operation of the battery pack P1 and the SOC of the battery pack P1 is insufficient to support the heating of the battery pack P1.

The temperature of the battery pack P1 herein may be the temperature of the house of the battery pack P1 or the temperature of the air within the internal space of the battery pack P1, or the temperature of any one of battery packs P1 or battery cells, or an average value of temperatures of all the battery cells in the battery pack P1, etc., which is not limited herein.

The heating temperature threshold may be the minimum temperature at which the battery pack P1 can operate normally, that is, the temperature threshold at which the battery pack heating system needs to be heated. The heating temperature threshold may be set based on operating scenes and operating requirements, which is not limited herein. For example, the heating temperature threshold may be any of the threshold range [−50° C., 5° C.]. If the temperature of the battery pack P1 is lower than the heating temperature threshold, the battery pack P1 cannot operate normally and needs to be heated.

The heating SOC requirement threshold may be a SOC required to perform the current heating of the battery pack P1, that is, a SOC threshold required for the battery pack heating system to heat the battery pack P1. The heating SOC requirement threshold may be preset based on operating scenarios and the operating requirements, or may be estimated by the battery management module P6 according to the current temperature of the battery pack P1, which is not limited herein. For example, the heating SOC requirement threshold may be any one of the threshold range [5%, 100%). If the temperature of the battery pack P1 is lower than the heating temperature threshold, and the SOC of the battery pack P1 is lower than the heating SOC requirement threshold, the power supply P41 of the auxiliary charging branch P4 is required to provide at least part of energy required for heating the battery pack P1.

The control module for auxiliary charging branch P8 may be configured to send a first control signal to the auxiliary charging branch P4 in response to the low-temperature-low-power heating request instruction to control the battery pack heating system to be connected to the auxiliary charging branch P4, so as to enable the power supply P41 to transmit energy to the battery pack P1 and/or the motor P3 via the external ports G1 and G2.

The vehicle control unit P5 may be used to send a second control signal to the motor control unit P7 to enable the motor control unit P7 to control on-off of the switch modules in the inverter P2.

The vehicle control unit P5 may be further configured to send a third control signal to the battery management module P6 to enable the battery management module P6 to control on-off of the main positive switch K1.

On one hand, the second control signal and the third control signal sent by the vehicle control unit P5 may cooperate with the first control signal sent by the control module for auxiliary charging branch P8 to enable the power supply P41 of the auxiliary charging branch P4 transmit energy to the battery pack P1 and/or the motor P3 via the external ports G1 and G2. That is, the battery pack P1 may receive the energy transmitted from the power supply P41 of the auxiliary charging branch P4, and/or the motor P3 may receive the energy transmitted from the power supply P41 of the auxiliary charging branch P4. On the other hand, the second control signal and the third control signal may cooperate to enable transmission of energy between the battery pack P1 and the motor P3 so as to heat the battery pack P1. That is, the energy may be transmitted from the battery pack P1 to the motor P3, and then transmitted back to the battery pack P1 from the motor P3, and so on. Such a circulation forms a plurality of cycles of charging and discharging of the battery pack P1. As a result, an alternating current may be generated in the circuit in which the battery pack P1 is located.

In some examples, the vehicle control unit P5 may also control, in response to the low-temperature-low-power heating request instruction, an onboard instrument to issue a prompt message to prompt the user about selection of whether to allow the low-temperature-low-power heating request instruction. If an input indicating allowance of the low-temperature-low-power heating request instruction is received, the control module for auxiliary charging branch P8 may subsequently transmit the first control signal, and the vehicle control unit P5 may transmit the second control signal and the third control signals, etc.

It should be noted that, before the battery management module P6 obtains the state parameter of the battery pack P1 and determines that the state parameter of the battery pack P1 meets the preset low-temperature-low-power condition, power-on self-inspection of the vehicle may be performed first. If the power-on self-inspection of the vehicle is normal, the battery management module P6 may compare the state parameter of the battery pack P1 and the preset low-temperature low-power condition. Specifically, when the user turns on the Key_On of the vehicle via a key, and the vehicle control unit P5 may receive a trigger power-on signal to trigger the power-on. Self-inspection of the vehicle control unit P5 may be performed to inspect whether or not the vehicle is normal, and if not, a vehicle fault information may be reported. The battery management module P6 may also perform inspection to inspect whether there is a failure in the battery management module P6 and the battery pack P1, and if a failure occurs, it may send a battery management failure information to the vehicle control unit P5. Then the comparison of the state parameter of the battery pack P1 and the preset low-temperature-low-power condition is not performed by the battery management module P6. The vehicle control unit P5 may report the battery management fault information once it is received. Similarly, the motor control unit P7 may also perform inspection. If the motor control unit P7 detects that the vehicle is running at the moment, it may send a notification message to the vehicle control unit P5. The vehicle control unit P5 may control the battery management module P6 not to perform the comparison of the state parameter of the battery pack P1 and the preset low-temperature-low-power condition. That is, when the battery management module P6, the battery pack P1, the vehicle control unit P5, the motor control unit P7, and the motor P3 are all in a normal state, the battery management module P6 may perform the comparison of the state parameter of the battery pack P1 and the preset low-temperature-low-power conditions and subsequent operations.

In an embodiment of the present application, the battery management module P6 may determine that the state parameter of the battery pack P1 meets the preset low-temperature-low-power condition, and send the low-temperature-low-power heating request instruction to the vehicle control unit P5 and the control module for auxiliary charging branch P8, respectively to request to operate in a low-temperature-low-power heating mode. The battery management module P6 may control the control module for auxiliary charging branch P8, and the vehicle control unit may control the battery management module P6 and the motor control unit P7, then the auxiliary charging branch P4, the main positive switch K1 and the switch modules in the inverter P2 can be controlled to enable the power supply P41 of the auxiliary charging branch P4 to transmit energy to the battery pack and/or the motor P3, so that the battery pack P1 and motor P3 can have sufficient energy to support heating of the battery pack P1. The battery pack P1 and the motor P3 may transmit energy to each other to form a cycle in which the battery pack P1 is charged and discharged, so that a current is generated in a circuit in which the battery pack P1 is located. The alternating current may continuously pass through the battery pack P1, so that the internal resistor of the battery pack P1 may emit heat. As a result, uniform and highly efficient self-heating of the battery pack can be realized even in the case of low power.

Figure 2:
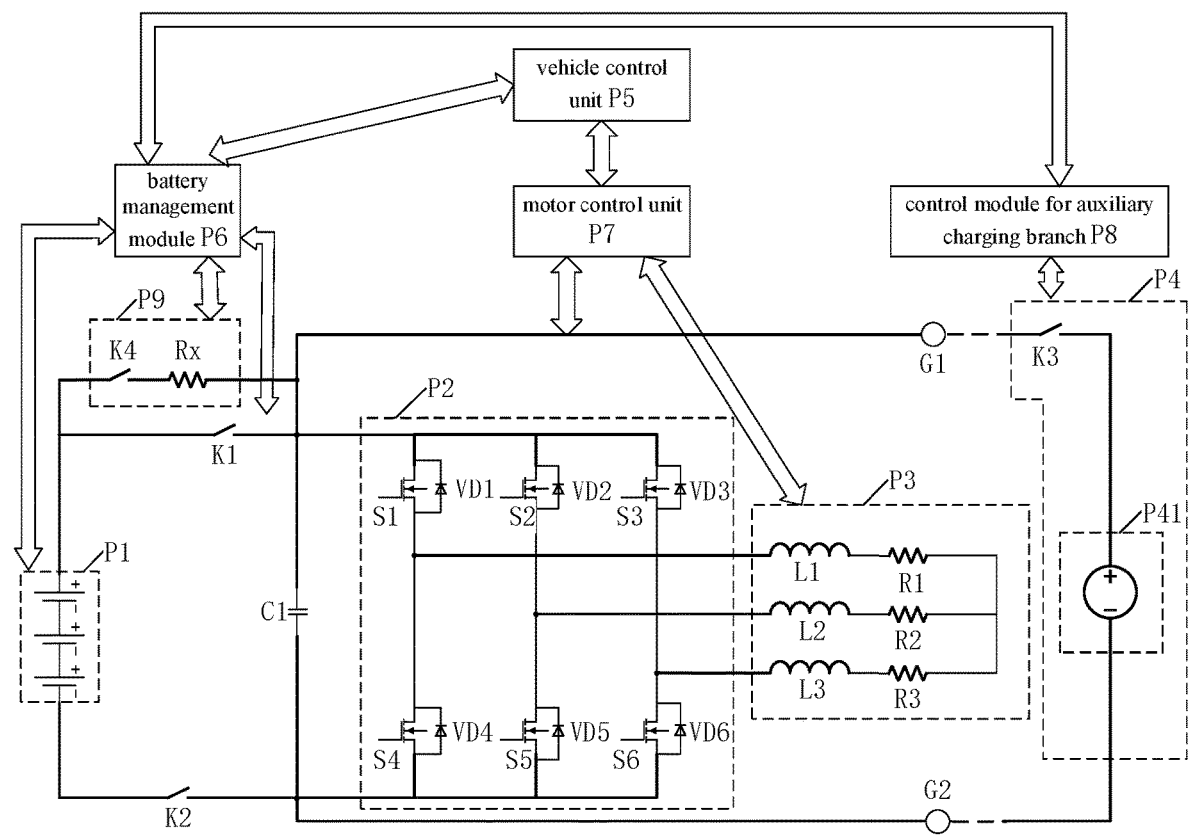
FIG. 2 is a schematic structure diagram of a battery pack heating system according to another embodiment of the present application.

FIG. 2 is a schematic structure diagram of a battery pack heating system according to another embodiment of the present application. As shown in FIG. 2, the battery pack heating system further includes a support capacitor C1, a pre-charging branch P9, and the auxiliary charging branch P4. The auxiliary charging branch P4 described above may further include an auxiliary switch module.

For convenience of description, in an embodiment of the present application, each device shown in FIG. 2 will be taken as an example for description. The first switch module includes a first power switch S1, the second switch module includes a second power switch S2, the third switch module includes a third power switch S3, the fourth switch module includes a fourth power switch S4, the fifth switch module includes a fifth power switch S5, and the sixth switch module includes a sixth power switch S6. The diode of the first power switch S1 is VD1, the diode of the second power switch S2 is VD2, the diode of the third power switch S3 is VD3, the diode of the fourth power switch S4 is VD4, the diode of the fifth power switch S5 is VD5, and the diode of sixth power switch S6 is VD6.

The control module for auxiliary charging branch P8 may be configured to send the first control signal to the auxiliary switch module in response to the low-temperature-low-power heating request instruction to control the auxiliary switch module to be turned on. That is, the auxiliary switch module may be turned on in response to the first control signal. The auxiliary switch module in the auxiliary charging branch P4 may be a switch K3. Then the switch K3 may be turned on in response to the first control signal.

The pre-charging branch P9 may be connected in parallel with the main positive switch K1. The pre-charging branch P9 may include a pre-charging switch K4 and a pre-charging resistor.

The battery management module P6 may be further configured to send a third driving signal to the pre-charging switch K4 to control the pre-charging switch K4 to be turned on for pre-charging. It should be noted that the pre-charging switch K4 is turned on, the main positive switch K1 is turned off, the main negative switch K2 is turned on, then the battery pack P1, the pre-charging branch P9, the support capacitor C1, and the main negative switch K2 form a loop for pre-charging.

When the battery management module P6 detects that the pre-charging is completed, the third driving signal is stopped from being sent to the pre-charging switch K4 to control the pre-charging switch K4 to be turned off, and the pre-charging is finished.

Function and specific operation of each part of the battery pack heating system in the low-temperature-low-power heating mode will be described below.

Specifically, the motor control unit P7 may be configured to send a first driving signal to a portion of the switch modules in the inverter P2 in response to the second control signal, to drive the portion of the switch modules to be periodically turned on and off, so as to enable the motor P3 to receive the energy transmitted from the power supply P41, or enable the motor P3 to receive energy transmitted from the battery pack P1, or enable the motor P3 to transmit energy to the battery pack P1.

The switch modules that are turned on in response to the first driving signal include a target upper bridge arm switch module and a target lower bridge arm switch module. The target upper bridge arm switch module is the switch module of the upper bridge arm of any bridge arm of the first phase bridge arm, the second phase bridge arm, and the third phase bridge arm. The target lower bridge arm switch module is the switch module of the lower bridge arm of at least one of the first phase bridge arm, the second phase bridge arm, and the third phase bridge arm other than the bridge arm that includes the target upper bridge arm switch module.

It should be noted that the switch modules that are not driven by the first driving signal are all turned off. That is, the switch modules except the target upper bridge arm switch module and the target lower bridge arm switch module are turned off.

For example, as shown in FIG. 2, if the target upper bridge arm switch module is the first switch module, the target lower bridge arm switch module is the fifth switch module and/or the sixth switch module. If the target upper bridge arm switch module is the second switch module, the target lower bridge arm switch module is the fourth switch module and/or the sixth switch module. If the target upper bridge arm switch module is the third switch module, the target lower bridge arm switch module is the fourth switch module and/or the fifth switch module.

The battery management module P6 may be further configured to send a second driving signal to the main positive switch K1 in response to the third control signal to drive the main positive switch K1 to be periodically turned on and off, so as to enable the battery pack P1 to receive the energy transmitted from the power supply P41, or enable the battery pack P1 to receive the energy transmitted from the motor P3, or enable the battery pack P1 to transmit the energy to the motor P3.

In some embodiments, the battery management module P6 may send the low-temperature-low-power heating request instruction to the control module for auxiliary charging branch P8. The vehicle control unit P5 may transmit the third control signal to the battery management module P6.

It should be noted that the voltage of the power supply P41 may be higher than the current voltage of the battery pack P1. The control module for auxiliary charging branch P8 may send the first control signal to the auxiliary switch module in response to the low-temperature-low-power heating request. The auxiliary switch module may be turned on in response to the first control signal.

The battery management module P6 may transmit the second driving signal to the main positive switch K1 in response to the third control signal. The main positive switch K1 may be periodically turned on and off in response to the second driving signal. During the period in which the main positive switch K1 is periodically turned on and off, the energy of the power supply P41 of the auxiliary charging branch P4 may be transmitted to the battery pack P1 through the switch K3, which is equivalent to charging the battery pack P1. It is worth mentioning that the transmission of energy from the power supply P41 of the auxiliary charging branch P4 to the battery pack P1 through the switch K3 and the external ports G1 and G2 may be performed one or more times to complete the energy transmission, which is not limited herein. The purpose is to support self-heating of the battery pack P1 by the energy of the battery pack P1.

The battery management module P6 may send a signal to the control module for auxiliary charging branch P8 to instruct the auxiliary switch module in the auxiliary charging branch P4 to be turned off. In response to the signal, the control module for auxiliary charging branch P8 may send a signal to the auxiliary switch module to instruct the auxiliary switch module to be turned off, and then the auxiliary switch module is turned off. The vehicle control unit P5 may send the second control signal to the motor control unit P7. The motor control unit P7 may transmit the first driving signal to a portion of the switch modules in the inverter P2 in response to the second control signal. The target upper bridge arm switch module and the target lower bridge arm switch module in the inverter P2 are periodically turned on and off in response to the first driving signal.

For example, the target upper bridge arm switch module is the first switch module, and the target lower bridge arm switch module is the fifth switch module. The first switch module and the fifth switch module may be periodically turned on and off in response to the first driving signal. Specifically, when the first power switch S1 and the fifth power switch S5 are turned on, the battery pack P1 is discharged. The current direction is: the battery pack P1→the main positive switch K1→the first power switch S1→the first stator inductor L1→the first resistor R1→the second resistor R2→the second stator inductor L2→the fifth power switch S5→the main negative switch K2→the battery pack P1. When the first power switch S1 and the fifth power switch S5 are turned off, the battery pack P1 is charged. The current direction is: the first stator inductor L1→the first resistor R1→the second resistor R2→the second stator inductor L2→The diode VD2 of the second power switch S2→the main positive switch K1→the battery pack P1→the main negative switch K2→the diode VD4 of the fourth power switch S4—the first stator inductor L1.

The selection of the target upper bridge arm switch module and the target lower bridge arm switch module is not limited to the above example. Different selection of the target upper bridge arm switch module and the target lower bridge arm switch module may correspond to a different discharge circuit and charging circuit of the battery pack P1, which is not limited herein.

It should be noted that, in some examples, the main positive switch K1 is not turned on simultaneously with the target upper bridge arm switch module and the target lower bridge arm switch module. The energy of the battery pack P1 may be transmitted to the motor P3 through the support capacitor C1 to enable the charging and discharging of the battery pack P1.

In the case where the main positive switch K1 is driven by the second driving signal to be turned on, a portion of the switch modules (i.e., the target upper bridge arm switch module and the target lower bridge arm switch module) may be driven by the first driving signal to be turned off. If the energy stored in the motor P3 is less than the energy stored in the battery pack P1, the battery pack P1 may transmit energy to the support capacitor C1. If the energy stored in the motor P3 is greater than the energy stored in the battery pack P1, the battery pack P1 may receive the energy transmitted from the motor P3.

In the case where a portion of the switch modules (i.e., the target upper bridge arm switch module and the target lower bridge arm switch module) is driven by the first driving signal driving to be turned on, the main positive switch K1 may be driven by the second driving signal to be turned off. The motor P3 may receive the energy transmitted from the support capacitor C1, and the energy of the support capacitor C1 may be obtained from the battery pack P1.

The process of discharging and charging of the battery pack P1 described above may be repeated to achieve self-heating of the battery pack P1.

In another embodiment, the battery management module P6 may send the low-temperature-low-power heating request instruction to the control module for auxiliary charging branch P8, and the vehicle control unit P5 may send the second control signal to the motor control unit P7.

The voltage of the power supply P41 may be greater than the current voltage of the battery pack P1. The control module for auxiliary charging branch P8 may send the first control signal to the auxiliary switch module in response to the low-temperature-low-power heating request instruction. The auxiliary switch module may be turned on in response to the first control signal.

The motor control unit P7 may transmit the first driving signal to a portion of the switch modules in the inverter P2 in response to the second control signal. The target upper bridge arm switch module and the target lower bridge arm switch module in the inverter P2 are periodically turned on and off in response to the first driving signal. During a period in which the target upper bridge arm switch module and the target lower bridge arm switch module in the inverter P2 are turned on, the energy of the power supply P41 of the auxiliary charging branch P4 may be transmitted to the motor P3 through the switch K3, that is, the motor P3 is charged. It is worth mentioning that transmission of energy from the power supply P41 of the auxiliary charging branch P4 to the motor P3 through the switch K3 and the external ports G1 and G2 may be performed one or more times to complete the energy transmission, which is not limited herein. The purpose is to support self-heating of the battery pack P1 by the energy of the battery pack P1 and the energy of the motor P3.

The battery management module P6 may send a signal to the control module for auxiliary charging branch P8 to instruct the auxiliary switch module in the auxiliary charging branch P4 to be turned off. In response to the signal, the control module for auxiliary charging branch P8 may send a signal to the auxiliary switch module to instruct the auxiliary switch module to be turned off, and the auxiliary switch module may be turned off accordingly. The vehicle control unit P5 may transmit the third control signal to the battery management module P6. The battery management module P6 may transmit the second driving signal to the main positive switch K1 in response to the third control signal. The main positive switch K1 may be periodically turned on and off in response to the second driving signal.

With periodical on-off of the main positive switch K1 and periodical on-off of the target upper bridge arm switch module and the target lower bridge arm switch module in the inverter P2, the energy of the battery pack P1 may be transmitted to the motor P3 and the energy of the motor P3 may be transmitted to the battery pack P1, via the support capacitor C1. For the mutual transmission of energy between the battery pack P1 and the motor P3, reference may be made to the above embodiments, and details are not described herein again.

In yet another embodiment, the battery management module P6 may send the low-temperature-low-power heating request instruction to the control module for auxiliary charging branch P8. The vehicle control unit P5 may transmit the second control signal to the motor control unit P7 and transmit the third control signal to the battery management module P6.

The voltage of the power supply P41 may be greater than the current voltage of the battery pack P1. The control module for auxiliary charging branch P8 may send the first control signal to the auxiliary switch module in response to the low-temperature-low-power heating request instruction. The auxiliary switch module may be turned on in response to the first control signal.

The motor control unit P7 may transmit the first driving signal to a portion of the switch modules in the inverter P2 in response to the second control signal. The target upper bridge arm switch module and the target lower bridge arm switch module in the inverter P2 are periodically turned on and off in response to the first driving signal. During a period where the target upper bridge arm switch module and the target lower bridge arm switch module in the inverter P2 are turned on, the energy of the power supply P41 of the auxiliary charging branch P4 may be transmitted to the motor through the switch K3 and the external ports G1 and G2, that is, the motor P3 is charged.

The battery management module P6 may transmit the second driving signal to the main positive switch K1 in response to the third control signal. The main positive switch K1 may be periodically turned on and off in response to the second driving signal. During periodical on-off of the main positive switch K1, the energy of the power supply P41 of the auxiliary charging branch P4 may be transmitted to the battery pack P1 through the switch K3 and the external ports G1 and G2, that is, the battery pack P1 is charged.

It is worth mentioning that transmission of energy from the power supply P41 of the auxiliary charging branch P4 to the battery pack P1 and the motor P3 through the switch K3 and the external ports G1 and G2 may be performed one or more times to complete the energy transmission, which is not limited herein. The purpose is to support self-heating of the battery pack P1 by the energy of the battery pack P1 and the energy of the motor P3.

The battery management module P6 may send a signal to the control module for auxiliary charging branch P8 to instruct the auxiliary switch module in the auxiliary charging branch P4 to be turned off. In response to the signal, the control module for auxiliary charging branch P8 may send a signal to the auxiliary switch module to instruct the auxiliary switch module to be off, and then the auxiliary switch module is turned off accordingly.

The target upper bridge arm switch module and the target lower bridge arm switch module in the inverter P2 may be periodically turned on and off in response to the first driving signal. The main positive switch K1 may be periodically turned on and off in response to the second driving signal. Via the support capacitor, the energy of the battery pack P1 may be transmitted to the motor P3, and the motor P3 may transmit energy to the battery pack P1. For the mutual transmission of energy between the battery pack P1 and the motor P3, reference may be made to the above embodiments, and details are not described herein again.

It should be noted that the vehicle control unit P5, the control module for auxiliary charging branch P8, the battery management module P6, and the motor control unit P7 may cooperate with each other to control on-off of the auxiliary switch module, the switch modules in the inverter P2, and the main positive switch K1 for self-heating of the battery pack P1. Self-heating of the battery pack P1 is not limited to the above manner.

In some examples, the battery management module P6 may be further configured to transmit the acquired state parameter of the battery pack P1 to the vehicle control unit P5. The state parameter of the battery pack P1 includes a SOC and a temperature.

The vehicle control unit P5 may also be used to transmit the received state parameter of the battery pack P10 to the motor control unit P7.

The motor control unit P7 may be further configured to calculate a first desired frequency and a first desired duty cycle based on a desired temperature rising rate and the received state parameter of the battery pack P1, and to adjust a frequency and a duty cycle of the first driving signal to the first desired frequency and the first desired duty cycle.

The motor control unit P7 may obtain the temperature rising rate of the battery pack P1 according to the temperature of the battery pack P1. The desired temperature rising rate is an expected temperature rising rate, which may be set according to specific operating scenarios and operating requirements, which is not limited herein. The heating rate of the battery pack P1 may be adjusted by adjusting the frequency and duty cycle of the first driving signal to the first desired frequency and the first desired duty cycle. The process of calculating the first desired frequency and the first desired duty cycle may be performed in real time, and the frequency and duty cycle of the first driving signal may be adjusted in real time.

In some examples, the battery management module P6 may be further configured to transmit the acquired SOC of the battery pack P1 to the vehicle control unit P5.

The vehicle control unit P5 may be also used to transmit the received SOC of the battery pack P1 to the motor control unit P7.

The motor control unit P7 may be further configured to acquire a motor parameter, calculate a second desired frequency and a second desired duty cycle based on the motor parameter, a desired motor parameter, and the received SOC of the battery pack, and adjust the frequency and the duty cycle of the first driving signal to the second desired frequency and the second desired duty cycle.

The motor parameter may include a phase current of the motor P3 or a busbar current. The busbar current may be the current flowing through the main positive switch K1. The phase current of the motor P3 may be the current flowing into or out of the three-phase input terminal of the motor P3. The desired motor parameter may include the desired phase current of the motor P3 or the desired busbar current. The desired motor parameter may be an expected motor parameter, which may be set according to specific operating scenarios and operating requirements, which is not limited herein.

The heating rate of the battery pack P1 may be adjusted by adjusting the frequency and the duty cycle of the first driving signal to the second desired frequency and the second desired duty cycle. The process of calculating the second desired frequency and the second desired duty cycle may be performed in real time, and the frequency and duty cycle of the first driving signal may be adjusted in real time.

In some examples, the battery management module P6 may be further configured to calculate a third desired frequency and a third desired duty cycle based on the desired temperature rising rate and the acquired state parameter of the battery pack P1, and adjust the frequency and the duty cycle of the second driving signal to the third desired frequency and the third desired duty cycle.

The state parameter of the battery pack P1 may include the SOC of the battery pack and the temperature of the battery pack. The battery management module P6 may obtain the temperature rising rate of the battery pack according to the temperature of the battery pack. The desired temperature rising rate is the expected temperature rising rate, which may be set according to specific operating scenarios and operating requirements, which is not limited herein. The heating rate of the battery pack P1 may be adjusted by adjusting the frequency and the duty cycle of the second driving signal to the third desired frequency and the third desired duty cycle. The process of calculating the third desired frequency and the third desired duty cycle may be performed in real time, and the frequency and the duty cycle of the second driving signal may be adjusted in real time.

In some examples, the motor control unit P7 may be also used to acquire the motor parameter and send the motor parameter to the vehicle control unit. The motor parameter may include the phase current of the motor or the busbar current. For the phase current of the motor or the busbar current, reference may be made to the related description in the above embodiments, which is not repeated herein.

The vehicle control unit P5 may be also used to transmit the received motor parameter to the battery management module P6.

The battery management module P6 is further configured to calculate a fourth desired frequency and a fourth desired duty cycle based on a desired motor parameter, the acquired SOC of the battery pack, and the received motor parameter, and adjust the frequency and the duty cycle of the second driving signal to the fourth desired frequency and the fourth desired duty cycle. With control of the frequency and the duty cycle of the second driving signal, on-off frequency and on-off duration of the main positive switch K1 may be adjusted to adjust the effective value of the busbar current, so as to adjust the self-heating of the battery pack heating system. For the desired motor parameter, reference may be made to the related content in the above embodiments, and details are not described herein again.

The process of calculating the fourth desired frequency and the fourth desired duty cycle may be performed in real time, and the frequency and the duty cycle of the second driving signal may be adjusted in real time.

In some examples, the motor control unit P7 may be also used to acquire the motor parameter and send the motor parameter to the vehicle control unit P5. The motor parameter may include the phase current of the motor or the busbar current.

The vehicle control unit P5 may be also used to transmit the received motor parameter to the battery management module P6.

The battery management module P6 may be further configured to obtain an estimated heating duration of the battery pack P1 based on the current temperature of the battery pack P1, the desired temperature of the battery pack P1, the motor parameter, and the desired motor parameter. The desired temperature of the battery pack P1 may be set according to specific operating scenarios and operating requirements, which is not limited herein. For the desired motor parameter, reference may be made to the related content in the above embodiments, and details are not described herein again.

The battery management module P6 may be further configured to send duration information including the estimated heating duration to the vehicle control unit P5. The value of the estimated heating duration is not limited herein, and may be, for example, any value within 1 minute to 40 minutes.

The vehicle control unit P5 may be also used to receive the duration information and issue a prompt message for prompting the estimated heating duration. The prompt message may be implemented as image information displayed on the onboard instrument, or may be implemented as sound information sent by the loudspeaker and the onboard instrument, which is not limited herein.

In addition to the low-temperature-low-power heating mode described above, the battery pack heating system may also enter a low-temperature heating mode or a stop heating mode.

In some examples, the battery management module P6 may be further configured to send a low-temperature heating request instruction to the control module for auxiliary charging branch P8, when it is determined that the temperature of the battery pack P1 is lower than the heating temperature threshold and the SOC of the battery pack P1 is higher than or equal to the heating SOC requirement threshold. The low-temperature heating request instruction is used to request the battery pack heating system to enter the low-temperature heating mode.

When the SOC of the battery pack P1 is higher than or equal to the heating SOC requirement threshold, it is indicated that the energy of the battery pack P1 is sufficient to support self-heating of the battery pack P1. Therefore, the power supply P41 of the auxiliary charging branch P4 is not required to supply energy. The control module for auxiliary charging branch P8 may be further configured to send a fourth control signal to the auxiliary charging branch P4 in response to the low-temperature heating request instruction, to control the battery pack heating system to be disconnected from the auxiliary charging branch P4.

In some examples, the battery management module P6 may be further configured to send a stop heating request instruction to the vehicle control unit P5 and the control module for auxiliary charging branch P8 respectively, when it is determined that the temperature of the battery pack P1 is higher than or equal to the heating temperature threshold and the SOC of the battery pack P1 is higher than or equal to the heating SOC requirement threshold. The stop heating request instruction is used to request the battery pack heating system to enter the stop heating mode.

The control module for auxiliary charging branch P8 may be further configured to send a fifth control signal to the auxiliary charging branch P4 in response to the stop heating request instruction, to control the battery pack heating system to be disconnected from the auxiliary charging branch P4.

The vehicle control unit P5 may be further configured to transmit a sixth control signal to the motor control unit P7 and a seventh control signal to the battery management module P6, in response to the stop heating request instruction.

The motor control unit P7 may be further configured to stop transmitting the first driving signal to the portion of the switch modules in the inverter P2, in response to the sixth control signal. The switch modules of inverter P2 are turned off.

The battery management module P6 may be further configured to stop transmitting the second driving signal to the main positive switch K1, in response to the seventh control signal. The main positive switch K1 are turned off.

In the process of heating the battery pack P1 by the battery pack heating system, the motor control unit P7 may also monitor the temperature of the switch modules in the inverter P2, the temperature at the stator of the motor P3, the busbar current, the phase current of the motor P3 or other parameters, and upload the monitored parameters to the vehicle control unit P5. The vehicle control unit P5 may adjust the battery pack heating system according to the parameters acquired through the monitoring.

The battery management module P6 may also monitor the temperature, the SOC, the insulation resistance and other parameters of the battery pack P1, and upload the monitored parameters to the vehicle control unit P5. The vehicle control unit P5 may adjust the battery pack heating system according to the parameters acquired through the monitoring.

The adjustment of the battery pack heating system may include: stopping the heating of the battery pack P1, or adjusting the first driving signal that is used to drive the switch modules so as to adjust the on-off frequency and the on-off duty cycle of the switch modules, or adjusting the second driving signal that is used to drive the main positive switch K1 so as to adjust the on-off frequency and the on-off duty cycle of the main positive switch K1.

Figure 3:
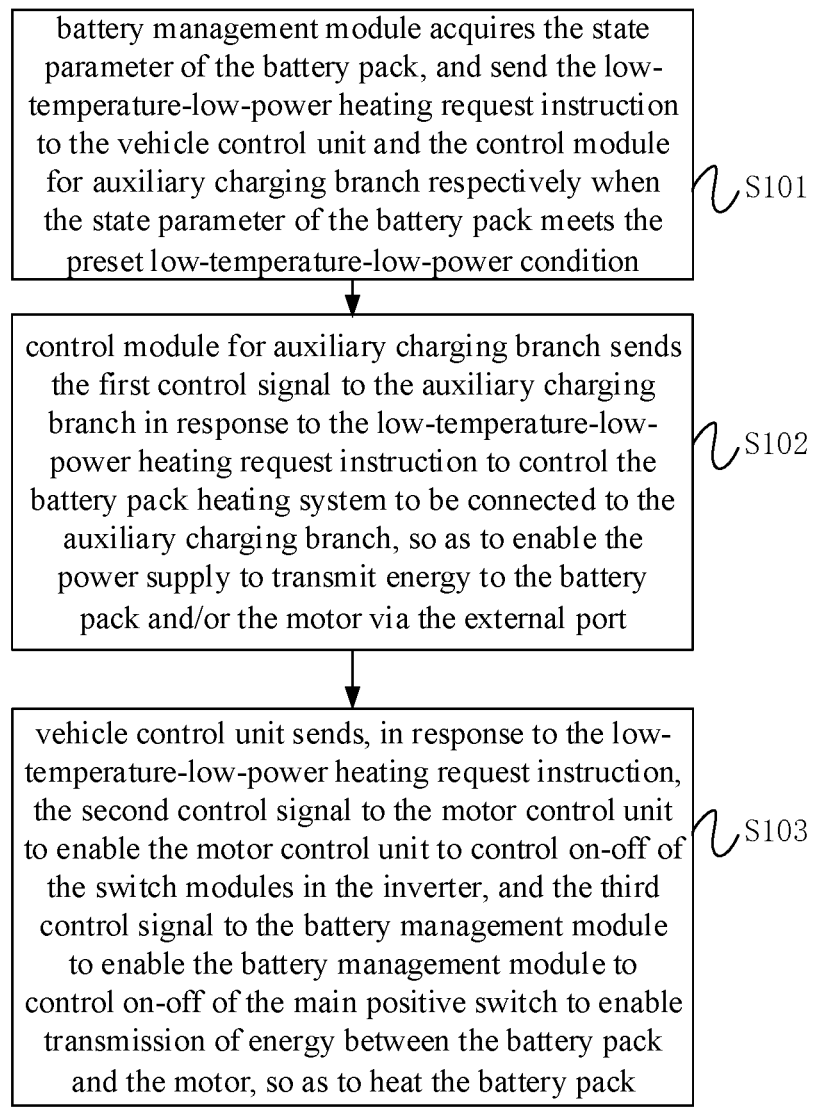
FIG. 3 is a flow chat of a control method for a battery pack heating system according to an embodiment of the present application.

Corresponding to the battery pack heating system in the above embodiments, the embodiments of the present application further provide a control method for the battery pack heating system. FIG. 3 is a flow chart of a control method for a battery pack heating system according to an embodiment of the present application. As shown in FIG. 3, the control method for the battery pack heating system may include steps S101 to S103.

In step S101, the battery management module acquires the state parameter of the battery pack, and send the low-temperature-low-power heating request instruction to the vehicle control unit and the control module for auxiliary charging branch respectively when the state parameter of the battery pack meets the preset low-temperature-low-power condition.

In some examples, the state parameter includes a temperature and a SOC, and the predetermined low-temperature-low-power condition includes the temperature being lower than the heating temperature threshold and the SOC being lower than the heating SOC requirement threshold. For example, the heating temperature threshold is greater than or equal to −50° C. and less than or equal to 5° C. The heating SOC requirement threshold is greater than or equal to 5% and less than 100%.

In step S102, the control module for auxiliary charging branch sends the first control signal to the auxiliary charging branch in response to the low-temperature-low-power heating request instruction to control the battery pack heating system to be connected to the auxiliary charging branch, so as to enable the power supply to transmit energy to the battery pack and/or the motor via the external port.

In step S103, the vehicle control unit sends, in response to the low-temperature-low-power heating request instruction, the second control signal to the motor control unit to enable the motor control unit to control on-off of the switch modules in the inverter, and the third control signal to the battery management module to enable the battery management module to control on-off of the main positive switch to enable transmission of energy between the battery pack and the motor, so as to heat the battery pack.

In the embodiments of the present application, the battery management module may determine that the state parameter of the battery pack meets the preset low-temperature-low-power condition, and send the low-temperature-low-power heating request instruction to the vehicle control unit and the control module for auxiliary charging branch respectively for the low-temperature-low-power heating mode. The battery management module may control the control module for auxiliary charging branch, and the vehicle control unit may control the battery management module and the motor control unit, then the auxiliary charging branch, the main positive switch and the switch modules in the inverter can be controlled to enable the power supply of the auxiliary charging branch to transmit energy to the battery pack and/or the motor, so that the battery pack and motor can have sufficient energy to support heating of the battery pack. The battery pack and the motor may transmit energy to each other to form a cycle in which the battery pack is charged and discharged, so that a current is generated in a circuit in which the battery pack is located. The alternating current may continuously pass through the battery pack, so that the internal resistor of the battery pack may emit heat. As a result, uniform and highly efficient self-heating of the battery pack can be realized even in the case of low power.

Figure 4:
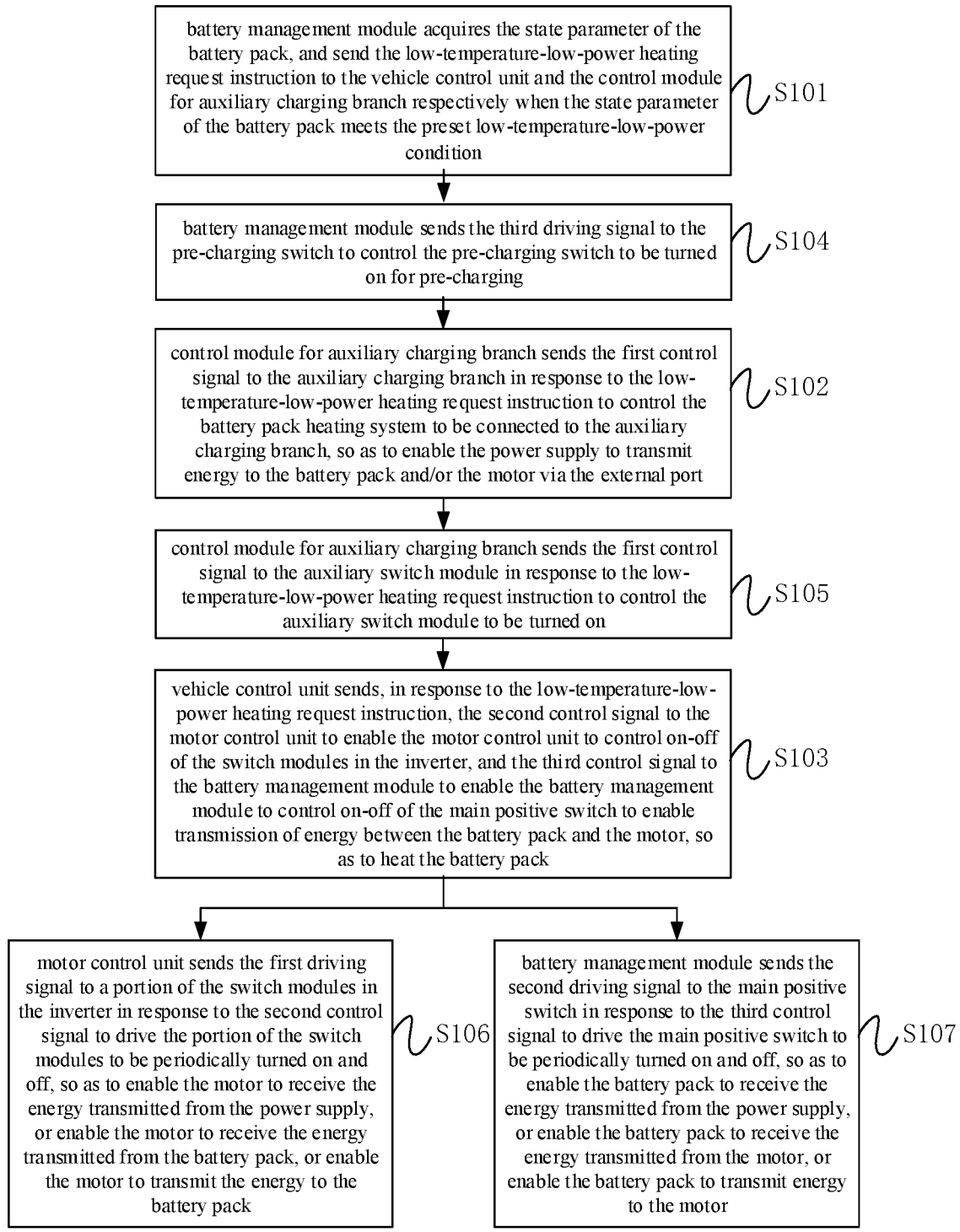
FIG. 4 is a flow chat of a control method for a battery pack heating system according to another embodiment of the present application.

Corresponding to the battery pack heating system shown in FIG. 1 and FIG. 2, FIG. 4 is a flow chat of a control method for a battery pack heating system according to another embodiment of the present application. FIG. 4 is different from FIG. 3 in that the control method for the battery pack heating system shown in FIG. 4 may further include steps S104 to S107.

In step S104, the battery management module sends the third driving signal to the pre-charging switch to control the pre-charging switch to be turned on for pre-charging.

The battery pack heating system may further include the pre-charging branch in parallel with the main positive switch, and the pre-charging branch may include the pre-charging switch and the pre-charging resistor.

In step S105, the control module for auxiliary charging branch sends the first control signal to the auxiliary switch module in response to the low-temperature-low-power heating request instruction to control the auxiliary switch module to be turned on.

The auxiliary charging branch may further include the auxiliary switch module. The voltage of the power supply may be higher than the current voltage of the battery pack.

In step S106, the motor control unit sends the first driving signal to a portion of the switch modules in the inverter in response to the second control signal to drive the portion of the switch modules to be periodically turned on and off, so as to enable the motor to receive the energy transmitted from the power supply, or enable the motor to receive the energy transmitted from the battery pack, or enable the motor to transmit the energy to the battery pack.

In step S107, the battery management module sends the second driving signal to the main positive switch in response to the third control signal to drive the main positive switch to be periodically turned on and off, so as to enable the battery pack to receive the energy transmitted from the power supply, or enable the battery pack to receive the energy transmitted from the motor, or enable the battery pack to transmit energy to the motor.

In some examples, the battery pack heating system may also include a support capacitor in parallel with the inverter. In the case where the second driving signal drives the main positive switch to be turned on, the first driving signal drives the portion of the switch modules to be turned off, so as to enable the battery pack to transmit energy to the support capacitor, or enable the battery pack to receive energy transmitted from the motor. In the case where the first driving signal drives the portion of the switch modules to be turned on, the second driving signal drives the main positive switch to be turned off, so as to enable the motor to receive energy transmitted from the support capacitor.

Figure 5:
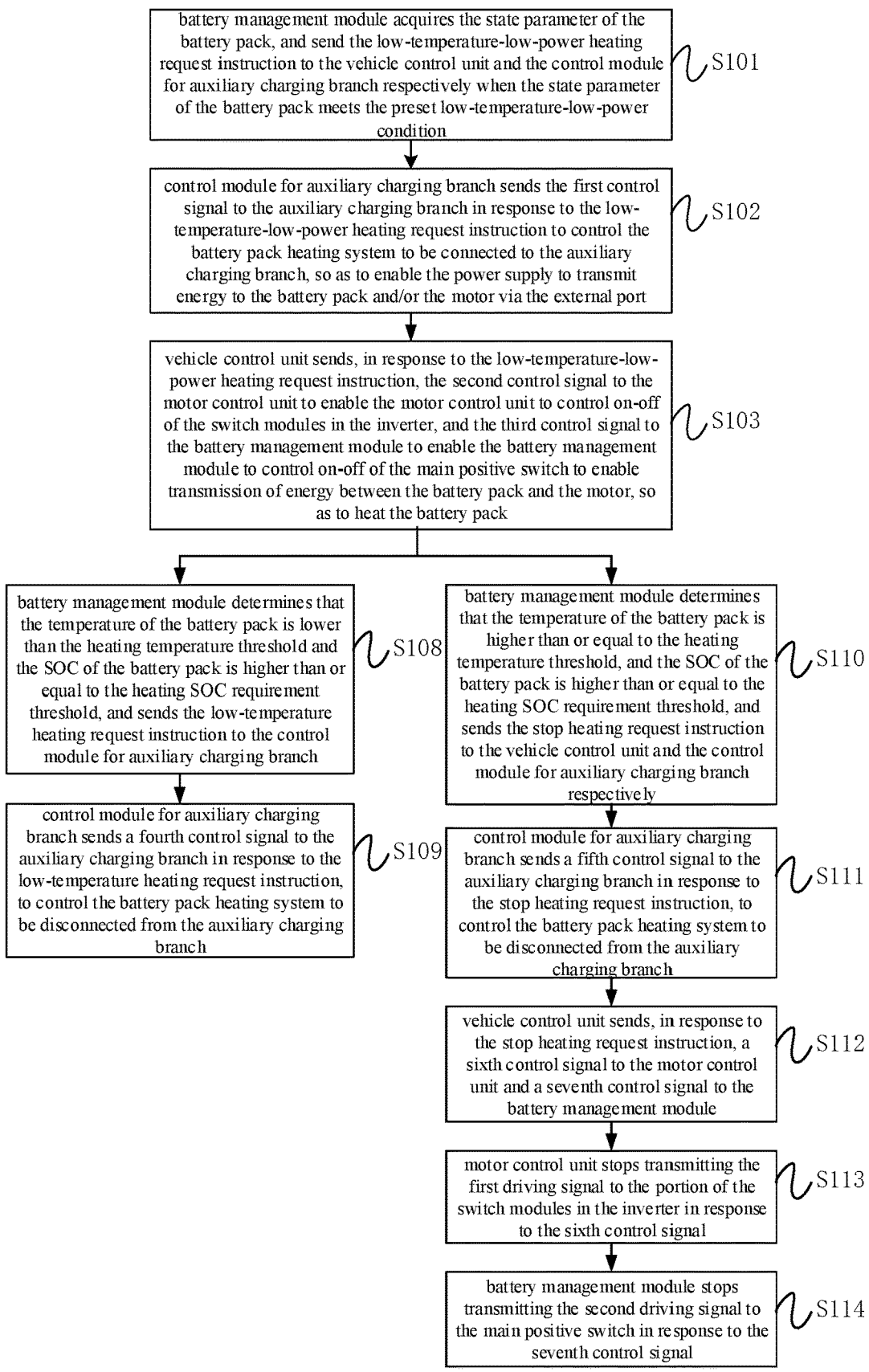
FIG. 5 is a flow chat of a control method for a battery pack heating system according to yet another embodiment of the present application.

FIG. 5 is a flow chat of a control method for a battery pack heating system according to yet another embodiment of the present application. FIG. 5 is different from FIG. 3 in that the control method for the battery pack heating system shown in FIG. 5 further includes steps S108 to S114.

In step S108, the battery management module determines that the temperature of the battery pack is lower than the heating temperature threshold and the SOC of the battery pack is higher than or equal to the heating SOC requirement threshold, and sends the low-temperature heating request instruction to the control module for auxiliary charging branch.

In step S109, the control module for auxiliary charging branch sends a fourth control signal to the auxiliary charging branch in response to the low-temperature heating request instruction, to control the battery pack heating system to be disconnected from the auxiliary charging branch.

In step S110, the battery management module determines that the temperature of the battery pack is higher than or equal to the heating temperature threshold, and the SOC of the battery pack is higher than or equal to the heating SOC requirement threshold, and sends the stop heating request instruction to the vehicle control unit and the control module for auxiliary charging branch respectively.

In step S111, the control module for auxiliary charging branch sends a fifth control signal to the auxiliary charging branch in response to the stop heating request instruction, to control the battery pack heating system to be disconnected from the auxiliary charging branch.

In step S112, the vehicle control unit sends, in response to the stop heating request instruction, a sixth control signal to the motor control unit and a seventh control signal to the battery management module.

In step S113, the motor control unit stops transmitting the first driving signal to the portion of the switch modules in the inverter in response to the sixth control signal.

In step S114, the battery management module stops transmitting the second driving signal to the main positive switch in response to the seventh control signal.

In some examples, the motor control unit may adjust the first driving signal to adjust the on-off frequency and the on-off duration of the switch modules of the inverter, so as to regulate the current used to charge and discharge the battery pack for heating by the battery pack heating system.

For example, the battery management module sends the acquired state parameter of the battery pack to the vehicle control unit. The state parameter may include the SOC and temperature. The vehicle control unit sends the received state parameter of the battery pack to the motor control unit. The motor control unit calculates the first desired frequency and the first desired duty cycle based on the desired temperature rising rate and the received state parameter of the battery pack, and adjusts the frequency and the duty cycle of the first driving signal to the first desired frequency and the first desired duty cycle.

For another example, the battery management module sends the acquired SOC of the battery pack to the vehicle control unit. The vehicle control unit transmits the received SOC of the battery pack to the motor control unit. The motor control unit acquires the motor parameter, and calculates the second desired frequency and the second desired duty cycle based on the motor parameter, the desired motor parameter, and the received SOC of the battery pack, and adjust the frequency and the duty cycle of the first driving signal to the second desired frequency and the second desired duty cycle. The motor parameter may include the phase current of the motor or the busbar current.

In some examples, the battery management module may adjust the second driving signal to adjust the on-off frequency and on-off duration of the main positive switch, so as to regulate heating of the battery by the battery pack heating system.

For example, the battery management module calculates the third desired frequency and the third desired duty cycle based on the desired temperature rising rate and the acquired state parameter of the battery pack, and adjusts the frequency and the duty cycle of the second driving signal to the third desired frequency and the third desired duty cycle. The state parameter may include the SOC and the temperature.

As another example, the motor control unit acquires the motor parameter and sends the motor parameter to the vehicle control unit. The motor parameter may include the phase current of the motor or the busbar current. The vehicle control unit sends the received motor parameter to the battery management module. The battery management module calculates the fourth desired frequency and the fourth desired duty cycle based on the desired motor parameter, the acquired SOC of the battery pack, and the received motor parameter, and adjusts the frequency and the duty cycle of the second driving signal to the fourth desired frequency and the fourth desired duty cycle.

In some examples, the motor control unit acquires the motor parameter and sends the motor parameter to the vehicle control unit. The motor parameter may include the bus current or the phase current of the motor. The vehicle control unit sends the received motor parameter to the battery management module. The battery management module obtains the estimated heating duration of the battery pack based on the current temperature of the battery pack, the desired temperature of the battery pack, the motor parameter, and the desired motor parameter. The battery management module sends duration information including the estimated heating duration to the vehicle control unit. The vehicle control unit receives the duration information and issues a prompt message for prompting the estimated heating duration to prompt the user about the estimated heating duration.

For related description of the control method for the battery pack heating system in the embodiment of the present application, reference may be made to the related content of the battery pack heating system in the above embodiments, and details are not described herein again.

It is to be understood that various embodiments in the specification are described in a progressive manner. The same or similar parts between the various embodiments may be referred to each other, and each embodiment focuses on a different part from other embodiments. For control method embodiments, reference may be made to the description for the embodiments for the battery pack heating system. The disclosure is not limited to the specific steps and structures described above and illustrated in the drawings. A person skilled in the art, after understanding of the spirit of the present application, may make various changes, modifications and additions, or change the order between the steps after understanding the spirit of the disclosure. Also, a detailed description of known method techniques is omitted herein for the sake of brevity.

Those skilled in the art should understand that the above embodiments are exemplary rather than limitative. Different technical features in different embodiments may be combined to obtain beneficial effects. Other variations of the described embodiments can be understood and practiced by those skilled in the art upon studying the drawings, the specification and the claims herein. In the claims, the term "comprising" does not exclude other means or steps; the indefinite article "a" does not exclude a plurality of; the terms "first", "second" are used to illustrate names rather than to indicate any particular order. Any reference numerals in the claims should not be construed as limiting the scope of protection. The functions of the various parts in the claims may be implemented by a single hardware or software module. The presence of certain features in different dependent claims does not indicate that these technical features cannot be combined to achieve beneficial effects.

What is claimed is:

1. A battery pack heating system, comprising:
   a main positive switch, a main negative switch, an inverter, an external port, a motor, an auxiliary charging branch, a control module for auxiliary charging branch, a vehicle control unit, a motor control unit, and a battery management module, wherein:
   the main positive switch is configured to be connected to a positive electrode of a battery pack;
   the main negative switch is configured to be connected to a negative electrode of the battery pack;
   the inverter is connected to the main positive switch and the main negative switch and comprises a plurality of switch modules;
   the external port is connected to the inverter and the auxiliary charging branch, and the auxiliary charging branch comprises a power supply and an auxiliary switch module;
   the battery management module is configured to acquire a state parameter of the battery pack, wherein the state parameter comprises a temperature and a state of charge, SOC, of the battery pack, and send, when the temperature is lower than a heating temperature threshold and the SOC is lower than a heating SOC requirement threshold, a low-temperature-low-power heating request instruction to the vehicle control unit and the control module for auxiliary charging branch respectively;
   the control module for auxiliary charging branch is configured to send a first control signal to the auxiliary charging branch in response to the low-temperature-low-power heating request instruction, wherein the auxiliary switch module in the auxiliary charging branch is turned on in response to the first control signal; and
   the battery management module is further configured to send, in response to a third control signal, a second driving signal to the main positive switch to drive the main positive switch to be periodically turned on or off, wherein the third control signal is sent from the vehicle control unit to the battery management module in response to the low-temperature-low-power heating request instruction, and wherein during the main positive switch is periodically turned on or off, the battery pack is charged by energy of the power supply of the auxiliary charging branch;
   the battery management module is further configured to send a signal to the control module for auxiliary charging branch to instruct the auxiliary switch module in the auxiliary charging branch to be turned off;

the control module for auxiliary charging branch is further configured to send, in response to the signal, a signal to the auxiliary switch module to instruct the auxiliary switch module to be turned off, and then the auxiliary switch module is turned off;

the vehicle control unit is configured to send, in response to the low-temperature-low-power heating request instruction, a second control signal to the motor control unit to enable the motor control unit to control the switch modules in the inverter to be periodically turned on or off to enable transmission of energy between the battery pack and the motor, so as to heat the battery pack.

2. The battery pack heating system of claim 1, wherein: the motor control unit is further configured to send, in response to the second control signal, a first driving signal to a portion of the switch modules in the inverter to drive the portion of switch modules to be periodically turned on and off.

3. The battery pack heating system of claim 2, wherein the inverter comprises a first phase bridge arm, a second phase bridge arm, and a third phase bridge arm connected in parallel, the first phase bridge arm, the second phase bridge arm, and the third phase bridge arm each comprise an upper bridge arm and a lower bridge arm, and the upper bridge arm is provided with a switch module, and the lower bridge arm is provided with a switch module; wherein:

the switch modules that are turned on in response to the first driving signal comprise a target upper bridge arm switch module and a target lower bridge arm switch module, the target upper bridge arm switch module is the switch module of the upper bridge arm of any bridge arm of the first phase bridge arm, the second phase bridge arm, and the third phase bridge arm, and the target lower bridge arm switch module is the switch module of the lower bridge arm of at least one of the first phase bridge arm, the second phase bridge arm, and the third phase bridge arm other than the bridge arm that comprises the target upper bridge arm switch module;

the switch module comprises a diode;

for the switch module of the upper bridge arm, an anode of the diode is connected to a connection point of the upper bridge arm and the lower bridge arm, and a cathode of the diode is located between the upper bridge arm and the main positive switch;

for the switch module of the lower bridge arm, an anode of the diode is located between the lower bridge arm and the main negative switch, and a cathode of the diode is connected to connection point of the upper bridge arm and the lower bridge arm;

a first phase input terminal, a second phase input terminal, and a third phase input terminal of the motor are respectively connected to a connection point of the upper bridge arm and the lower bridge arm of the first phase bridge arm, a connection point of the upper bridge arm and the lower bridge arm of the second phase bridge arm, and a connection point of the upper bridge arm and the lower bridge arm of the third phase bridge arm.

4. The battery pack heating system of claim 1, wherein the battery pack heating system further comprises a support capacitor connected in parallel with the inverter, wherein:

in a case where the second driving signal drives the main positive switch to be turned on, the first driving signal drives the portion of the switch modules to be turned off, so as to enable the battery pack to transmit energy to the support capacitor, or enable the battery pack to receive energy transmitted from the motor; and in a case where the first driving signal drives the portion of the switch modules to be turned on, the second driving signal drives the main positive switch to be turned off, so as to enable the motor to receive energy transmitted from the support capacitor.

5. The battery pack heating system of claim 1, wherein:
the motor control unit is further configured to acquire a motor parameter, and send the motor parameter to the vehicle control unit, wherein the motor parameter comprises a phase current of the motor or a busbar current;

the vehicle control unit is further configured to send the received motor parameter to the battery management module; and the battery management module is further configured to obtain an estimated heating duration of the battery pack based on a current temperature of the battery pack, a desired temperature of the battery pack, the motor parameter, and a desired motor parameter, and send duration information including the estimated heating duration to the vehicle control unit; and the vehicle control unit is further configured to receive the duration information, and issue a prompt message for promoting the estimated heating duration.

6. A control method for the battery pack heating system of claim 1, comprising:

acquiring, by the battery management module, a state parameter of the battery pack, wherein the state parameter comprises a temperature and a state of charge, SOC, of the battery pack, and sending a low-temperature-low-power heating request instruction to the vehicle control unit and the control module for auxiliary charging branch respectively when the temperature is lower than a heating temperature threshold and the SOC is lower than a heating SOC requirement threshold;

sending, by the control module for auxiliary charging branch, a first control signal to the auxiliary charging branch in response to the low-temperature-low-power heating request instruction wherein the auxiliary switch module in the auxiliary charging branch is turned on in response to the first control signal;

sending, by the battery management module in response to a third control signal, a second driving signal to the main positive switch to drive the main positive switch to be periodically turned on or off, wherein the third control signal is sent from the vehicle control unit to the battery management module in response to the low-temperature-low-power heating request instruction, and wherein during the main positive switch is periodically turned on or off, the battery pack is charged by energy of the power supply of the auxiliary charging branch;

sending, by the battery management module, a signal to the control module for auxiliary charging branch to instruct the auxiliary switch module in the auxiliary charging branch to be turned off;

sending, by the control module for auxiliary charging branch in response to the signal, a signal to the auxiliary switch module to instruct the auxiliary switch module to be turned off, and then the auxiliary switch module is tuned off; and sending, by the vehicle control unit in response to the low-temperature-low-power heating request instruction, a second control signal to the motor control unit to enable the motor control unit to control the switch modules in the inverter to be periodically turned on or turned off to enable transmission of energy between the battery pack and the motor, so as to heat the battery pack.

7. The control method for the battery pack heating system of claim 6, further comprising:
sending, by the motor control unit in response to the second control signal, a first driving signal to a portion of the switch modules in the inverter to drive the portion of switch modules to be periodically turned on and off.

8. The control method for the battery pack heating system of claim 6, wherein the battery pack heating system further comprises a support capacitor connected in parallel with the inverter, wherein:
in a case where the second driving signal drives the main positive switch to be turned on, the first driving signal drives the portion of the switch modules to be turned off, so as to enable the battery pack to transmit energy to the support capacitor, or enable the battery pack to receive energy transmitted from the motor; and
in a case where the first driving signal drives the portion of the switch modules to be turned on, the second driving signal drives the main positive switch to be turned off, so as to enable the motor to receive energy transmitted from the support capacitor.

9. The control method for the battery pack heating system of claim 6, further comprising:
acquiring, by the motor control unit, a motor parameter, and sending the motor parameter to the vehicle control unit, wherein the motor parameter comprises a phase current of the motor of a busbar current;
sending, by the vehicle control unit, the received motor parameter to the battery management module;
obtaining, by the battery management module, an estimated heating duration of the battery pack based on a current temperature of the battery pack, a desired temperature of the battery pack, the motor parameter, and a desired motor parameter;
sending, by the battery management module, duration information including the estimated heating duration to the vehicle control unit; and
receiving, by the vehicle control unit, the duration information, and issuing a prompt message for prompting the estimated heating duration.

* * * * *